United States Patent [19]

Miyoshi et al.

[11] Patent Number: 4,687,704
[45] Date of Patent: Aug. 18, 1987

[54] MAGNETIC RECORDING MEDIUM

[75] Inventors: Takahito Miyoshi; Akihiro Matsufuji; Nobuyuki Yamamoto; Hajime Miyatsuka; Masaaki Fujiyama, all of Odawara, Japan

[73] Assignee: Fuji Photo Film Co., Ltd., Japan

[21] Appl. No.: 819,061

[22] Filed: Jan. 15, 1986

[30] Foreign Application Priority Data

Jan. 17, 1985 [JP] Japan .................................. 60-7282

[51] Int. Cl.$^4$ .......................... G11B 5/68; G11B 5/708
[52] U.S. Cl. ..................................... 428/328; 428/323; 428/329; 428/694; 428/900
[58] Field of Search ............... 428/323, 328, 329, 694, 428/900; 427/131

[56] References Cited

U.S. PATENT DOCUMENTS

| | | | |
|---|---|---|---|
| 4,420,408 | 12/1983 | Kajimoto et al. .................... | 428/900 |
| 4,420,531 | 12/1983 | Tokuda ............................... | 428/900 |
| 4,420,532 | 12/1983 | Yamaguchi et al. ................. | 428/900 |
| 4,448,842 | 5/1984 | Yamaguchi et al. ................. | 428/694 |
| 4,474,848 | 10/1984 | Yamaguchi et al. ................. | 428/694 |
| 4,547,419 | 10/1985 | Nishimatsu et al. ................ | 428/900 |

Primary Examiner—Paul J. Thibodeau
Attorney, Agent, or Firm—Gerald J. Ferguson, Jr.; Michael P. Hoffman; Ronni S. Malamud

[57] ABSTRACT

A magnetic recording medium such as a video tape comprising a magnetic recording layer which comprises a ferromagnetic metal powder having a specific surface area of not less than 42 m$^2$/g and an inorganic material powder having a Mohs' scale of hardness of not less than 5, wherein at least 90 wt. % of said inorganic material powder consists of particles having a particle size of 0.1–0.6 μm, 51–85 wt. % of a portion of said particles consisting of particles having a particle size of less than 0.3 μm, and the residual portion consisting of particles having a particle size of not less than 0.3 μm.

6 Claims, No Drawings

MAGNETIC RECORDING MEDIUM

BACKGROUND OF THE INVENTION

1. Field of the invention

The present invention relates to an improvement of a magnetic recording medium comprising a nonmagnetic support and a magnetic recording layer.

2. Description of prior arts

A magnetic recording medium (also referred to hereinafter as a magnetic tape) such as an audio-tape, a video-tape, or a recording medium employed in a computer system, basically comprises a nonmagnetic support and a magnetic recording layer provided on the support. The magnetic recording layer comprises a ferromagnetic powder such as a needle crystalline powder of $\gamma$-$Fe_2O_3$, Co-containing ferromagnetic iron oxide, or $CrO_2$ dispersed in a binder. Recently, a demand for a higher density recording system has increased, and hence studies of a magnetic recording medium using a ferromagnetic metal powder in place of the conventional oxide-type ferromagnetic powder have been made.

The ferromagnetic metal powder has been employed as a ferromagnetic powder of a recording medium of a computer system. The ferromagnetic metal powder is high in a coercive force (Hc) and a residual flux density (Br) and moreover is stable in a wide temperature range. For these reasons, the ferromagnetic metal powder has been also paid attention for the use in such magnetic recording media as a video-tape or an audio-tape. The ferro-magnetic metal powder is known to afford recording of a higher density, as the powder is more minimized.

While the ferromagnetic metal powder has excellent characteristics, there is a drawback that the ferromagnetic metal powder is low in the hardness. In more detail, a magnetic recording layer using the ferromagnetic metal powder shows poor running property, that is, the recording layer is easily scratched or the metal powder is easily dropped off from the layer in the course of running in contact with a magnetic head. These troubles cause the so-called drop-outs. Further, the dropped metal powder is apt to adhere to the surface of the magnetic head to cause clogging on the head. Furthermore, if a magnetic layer has a poor running property, the magnetic layer shows only a short still life in the still mode in which a still video image is continuously reproduced.

It is known that an abrasive (i.e., hard particles) such as corundum, silicon carbide or chromium oxide is incorporated into a magnetic recording layer to improve the running property of the recording layer under the conditions to allow maintaining the electromagnetic conversion characteristics of the magnetic recording medium using a ferromagnetic metal alloy powder. Generally, however, the effect of incorporation of an abrasive is observed only where the abrasive is incorporated in a large amount. But, a magnetic recording layer containing a large amount of an abrasive likely causes extreme abrasion of a magnetic head employed in contact with the recording layer. Further, a large amount of an abrasive is unfavorable to the electromagnetic conversion characteristics of the recording medium. Furthermore, the incorporated abrasive is apt to be easily dropped off to adhere to the surface of the magnetic head.

For the above-described reasons, the conventional measure for improving the running property of the magnetic recording layer is not thought to be satisfactory, in view of the resulting characteristics of the magnetic recording medium as well as unfavorable effect given to a magnetic head.

SUMMARY OF THE INVENTION

It is an object of the present invention to provide a new magnetic recording medium.

It is another object of the invention to provide a magnetic recording medium which is improved particularly with respect to the electromagnetic conversion characteristics.

It is a further object of the invention to provide a magnetic recording medium which is improved particularly with respect to the electromagnetic conversion characteristics as well as the running property.

There is provided by the present invention a magnetic recording medium comprising a magnetic recording layer which comprises a ferromagnetic metal powder having a specific surface area of not less than 42 $m^2/g$ and an inorganic material powder having a Mohs' scale of hardness of not less than 5, wherein at least 90 wt. % of said inorganic material powder consists of particles having a particle size of 0.1–0.6 $\mu$m, a 51–85 wt. % portion consisting of particles having a particle size of less than 0.3 $\mu$m, and the residual portion consisting of particles having a particle size of not less than 0.3 $\mu$m.

The magnetic recording medium of the invention shows improved electromagnetic conversion characteristics as well as an improved running property.

Moreover, although an inorganic material powder having a high hardness is employed, the inorganic material powder is hardly dropped off from the magnetic recording layer, and accordingly the clogging on a magnetic head is hardly given in the course of running in contact with the magnetic head.

DETAILED DESCRIPTION OF THE INVENTION

A magnetic recording medium of the invention comprises a nonmagnetic support and a magnetic recording layer provided on the support. The magnetic recording layer comprises a ferromagnetic metal powder dispersed in a binder.

There is no specific limitation on the nonmagnetic support employable in the present invention, and a material of the nonmagnetic support can be selected from those employed conventionally. Examples of the nonmagnetic support material include synthetic resin films such as films of polyethylene terephthalate, polyethylene, polypropylene, polycarbonate, polyethylene naphthalate, polyamide, polyamideimide, polyimide, polysulfone and polyether polysulfone; and metallic foils such as aluminum foil and stainless steel foil. The thickness of the nonmagnetic support generally is in the range of 3 to 50 $\mu$m and preferably in the range of 5 to 30 $\mu$m.

The nonmagnetic support may have a back layer (or backing layer) on the opposite side of the side where a magnetic recording layer is to be coated.

The magnetic recording medium of the invention has the above-described nonmagnetic support coated thereupon with a magnetic recording layer comprising a particulate ferromagnetic metal powder dispersed in a binder.

The ferromagnetic metal powder employable in the invention is one containing Fe, Co or Ni and having a specific surface area (S-BET) of not less than 42 m$^2$/g, preferably not less than 45 m$^2$/g. If the specific surface area is less than 42 m$^2$/g, it is difficult to obtain an aimed magnetic recording medium having high electromagnetic conversion characteristics.

As a typical ferromagnetic metal powder, there can be mentioned a ferromagnetic alloy powder containing a metal component of at least 75 wt. % in which at least 80 wt. % of the metal component comprises at least one ferromagnetic metal or metal alloy (e.g., Fe, Co, Ni, Fe-Co, Fe-Ni, Co-Ni, or Co-Ni-Fe) and the remaining metal component, if present, comprises other atom(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, or P). The ferromagnetic metal component may contain a small amount of water, hydroxide, or oxide. These ferromagnetic metal powder are already known, and can be prepared by known methods. The ferromagnetic metal powder to be employed in the invention can be also prepared according to the known methods.

For instance, a ferromagnetic metal powder can be prepared by the following known processes.

(a) a process of reducing a double organic acid salt (typically, an oxalate) by a reducing gas such as hydrogen;

(b) a process of reducing a ferric oxide and/or other metal oxide by a reducing gas such as hydrogen to obtain Fe particle, Fe-Co particle, etc.;

(c) a process of thermally decomposing a metal carbonyl compound;

(d) a process of reducing a ferromagnetic metal in an aqueous solution in the presence of a reducing agent such as sodium borohydride, hypophosphite or hydrazine;

(e) a process of electrolyzing a ferromagnetic metal solution at mercury electrode and separating the deposited ferromagnetic metal powder from mercury; and (f) a process of evaporating a metal in an inert atmosphere under reduced pressure to obtain a fine powder.

There is no specific limitation on the shape of the ferromagnetic metal powder, and the ferromagnetic powder normally used is in a needle shape, grain shape, dice shape, rice shape or plate shape.

The amount of the binder is generally in the range of 10 to 100 parts by weight, preferably in the range of 20 to 40 parts by weight, per 100 parts by weight of the ferromagnetic metal powder.

The binder employable in the formation of the magnetic recording layer can be selected from the known binder materials. Examples of the binder material include vinyl chloride/vinyl acetate copolymers; copolymers of vinyl chloride/vinyl acetate, vinylalcohol, maleic acid and/or acrylic acid; vinylidene chloride/vinyl chloride copolymers; vinyl chloride/ acrylonitrile copolymers; ethylene/vinyl acetate copolymers; cellulose derivatives (e.g., nitrocellulose resins); acrylic resins; polyvinyl acetal resin; polyvinyl butyral resin; epoxy resin; phenoxy resin; polyurethane resin and polycarbonate polyurethane resin.

It is necessary to include in the magnetic recording layer of the recording medium of the invention an inorganic material powder having a Mohs' scale of hardness of not less than 5. There is no specific limitation on the inorganic material powder to be employed, provided that the inorganic material powder has a Mohs' scale of hardness of not less than 5. Examples of the inorganic material powder having a Mohs' scale of hardness of not less than 5 include Al$_2$O$_3$(Mohs' scale of hardness: 9), TiO (hardness: 6), TiO$_2$(hardness: 6.5), SiO$_2$(hardness: 7), SnO$_2$(hardness: 6.5), Cr$_2$O$_3$(hardness: 9) and α-Fe$_2$O$_3$(hardness: 5.5). These inorganic material powders can be used singly or in combination. Particularly preferred are inorganic material powders having a Mohs' scale of hardness of not less than 8. In the case of using a relatively soft inorganic material powder such as one having a Mohs' scale of hardness of less than 5, there areise drawbacks such that the inorganic material powder is easily dropped off from the magnetic recording layer, the clogging on the magnetic head easily occurs owing to the weak abrasion of the head, and the running property of the layer becomes poor.

With respect to the inorganic material powder used in the invention, at least 90 wt. % of the total weight thereof consists of particles having a particle size of 0.1–0.6 μm. Further, a 51–85 wt. % (preferably 55–80 wt. %, and more preferably 60–75 wt. %) portion of said inorganic material powder consists of particles having a particle size of less than 0.3 μm, and the residual portion consists of particles having a particle size of not less than 0.3 μm.

More in detail, it is required in the invention that most of the inorganic material powder have a particle size ranging from 0.1 to 0.6 μm, and among them particles having a particle size of less than 0.3 μm are employed in a large amount but an amount within the specific range (not less than half of the amount). If particles having a particle size ranging from 0.1 to 0.3 μm (referred to hereinafter as fine particles) is contained in an excessively large amount, the running property of the magnetic recording medium becomes poor, and accordingly the still life is made shorter when the medium is used for a video tape. On the contrary, if particles having a particle size ranging from 0.3 to 0.6 μm (referred to hereinafter as rough particles) is contained in an excessively large amount, the electromagnetic conversion characteristics of the magnetic recording medium such as reproducing output is decreased, and the clogging on the head is apt to easily take place.

The inorganic material powder is incorporated into the magnetic recording layer in an amount of generally 0.1 to 20 parts by weight (i.e., 0.1 to 20 wt. %), preferably 1 to 10 parts by weight (i.e., 1 to 10 wt. %), based on 100 parts by weight of the ferromagnetic metal powder.

It is preferred to incorporate into the magnetic recording layer one or more other additives as well as the above-mentioned inorganic material powder. Examples of the other additives include carbon black having a mean diameter of 10 to 300 mμ.

The magnetic recording medium of the present invention can be produced by a process comprising the steps of first by preparing a magnetic paint (or dispersion) containing the ferromagnetic metal powder, binder, above-described inorganic material powder, and optional additives such as dispersing agent, lubricant, stabilizer and antistatic agent in an organic solvent such as methyl ethyl ketone, or cyclohexane, then applying this magnetic paint onto a nonmagnetic support, upon which the magnetic paint is processed to dryness.

The dispersing agent employable is, for example, a fatty acid having 12 to 22 carbon atoms (e.g., caprylic acid, capric acid, lauric acid, myristic acid, palmitic acid, stearic acid, behenic acid, oleic acid, elaidic acid, linoleic acid, linolenic acid, stearolic acid; a soap of an alkali metal (e.g., lithium, sodium or potassium) or an alkaline earth metal (e.g., magnesium, calcium or barium) of the above-stated fatty acid; esters of the above-stated fatty acid and these compounds in which fluorine atom(s) is substituted for a portion or whole of hydrogen atom(s); a fatty acid amide derived from the fatty acid, an aliphatic amine, a higher alcohol, a polyalkyleneoxide alkylphosphate ester, an alkylphosphate ester, an alkylborate ester, a sarcosinate, alkyl ether esters, or other known disperser or surfactant such as a trialkylpolyolefin quaternary ammonium salt and lecithin. In the case of using a dispersing agent, the dispersing agent is generally contained in the magnetic paint in an amount of 0.1 to 10 parts by weight per 100 parts of the ferromagnetic metal powder employed.

The antistatic agent is, for example, a conductive powder (e.g., carbon black or carbon black graft polymer), a natural surfactant (e.g., saponin), a nonionic surfactant (e.g., of alkylenoxide type, of glycerol type, or of glycidol type), a cationic surfactant (e.g., higher alkylamine, quarternary ammonium salt, heterocyclic phosphonium compound such as pyridine or sulfonium compound), an anionic surfactant (e.g., carboxylic acid, sulfonic acid, phosphate or compound having acid groups such as sulfuric ester-type or phosphoric ester type), and an amphoteric surfactant (e.g., amino acid, amino sulfonic acid, sulfuric or phosphoric ester of amino alcohol). For instance, the conductive powder is generally employed in an amount of 0.1 to 10 parts by weight per 100 parts of the ferromagnetic metal powder employed. Likewise, the surfactant is generally employed in the same amount.

The lubricant is, for example, a fatty acid, a higher alcohol, a fatty acid ester of a monovalent fatty acid having 12 to 20 carbon atoms and a mono/polyhydric alcohol having 3 to 20 carbon atoms (e.g., butyl stearate or sorbitan oleate); a mineral oil, an animal or vegetable oil, an olefin polymer having a low molecular weight, an $\alpha$-olefin polymer having low molecular weight, or other known lubricant, for instance, for plastics (e.g., graphite powder, molybdenum disulfide powder or teflon powder). The amount of lubricant can be determined according to the known method.

It should be understood that the above-stated additives such as a dispersing agent, an antistatic agent and a lubricant are by no means mentioned under the restriction that those additives have only functions strictly as described above. For instance, a dispersing agent can sometimes serve as a lubricant or an antistatic agent. Accordingly, as a matter of course, the functions of the compounds as classified above are by no means restricted to the above-classified functions. In the case of using an additive having plural functions, its amount is preferably determined in consideration of the functions.

The magnetic paint prepared as above is applied to the aforementioned nonmagnetic support. The magnetic paint can be coated directly on the nonmagnetic support, but it is possible to provide an adhesive layer to combine the magnetic paint layer with the nonmagnetic support. Examples of the coating method of the magnetic paint include methods of air doctor coating, blade coating, rod coating, extrusion coating, air knife coating, squeeze coating, impregnation coating, reverse-roll coating, transfer roll coating, gravure coating, kiss-roll coating, cast coating, spray coating and spin coating. Other methods can be also employed.

The procedure for preparing a magnetic paint comprising mixing the above-mentioned ferromagnetic metal powder with the binder as well as the procedure for coating the magnetic paint on the support as such are described more in detail in Japanese Patent Provisional Publications No. 54(1989)-46011 and No. 54(1989)-21805.

The magnetic recording layer preferably has a thickness (after dryness) generally of approx. 0.5 to 10 $\mu$m, preferably of approx. 1.5 to 7.0 $\mu$m.

The magnetic layer provided on the nonmagnetic support is generally subjected to a treatment of orienting the ferromagnetic metal powder contained in the magnetic recording layer, that is, a magnetic orientation, and then subjected to a drying process. If necessary, a smoothing process is further carried out. The magnetic recording medium having been subjected to these processes such as the smoothing process is subsequently cut to give a medium having a desired shape.

The magnetic recording medium of the invention shows excellent electromagnetic conversion characteristics, and is particularly advantageous in the case that it is prepared in the form of a video tape. A video tape according to the invention shows remarkably high video output. Moreover, this video tape shows an improved running property, and hence it shows a relatively long still life. In addition, the clogging hardly occurs on the magnetic head on which the tape runs.

The examples and the comparison examples of the present invention are given below. In the following examples, the expression "parts" means "parts by weight", unless otherwise specified.

EXAMPLE 1

The components indicated below were kneaded in a ball mill for 48 hrs. to give a dispersion.

Ferromagnetic metal alloy powder (Fe-Zn-Ni alloy, Fe: 94 wt. %, Zn: 4 wt. %, Ni: 2 wt. %, Hc: 1,500 Oe, specific surface area(S-BET): 45 m$^2$/g): 100 parts;
Vinyl chloride/vinyl acetate/maleic anhydride copolymer (available from Nippon Zeon Co., Ltd.; 400×110 A degree of polymerization: 400): 12 parts;
Al$_2$O$_3$(inorganic material powder, Mohs' scale of hardness: 9, particle size: 0.1–0.6 $\mu$m):
  particle size of less than 0.3 $\mu$m: 4 parts;
  particle size of not less than 0.3 $\mu$m: 2 parts;
  (fine particle : rough particle=approx. 67 : 33)
Carbon black (mean particle size: 40 m$\mu$): 2 parts;
Methyl ethyl ketone; 300 parts.

To the dispersion was added 5 parts of polyisocyanate, and the mixture was further kneaded for one hour. The resulting dispersion was filtered over a filter having a mean pore size of 1 $\mu$m to give a magnetic paint.

The magnetic paint was coated over a polyethylene terephthalate support (thickness: 10 $\mu$m) to give a coated layer of a thickness 4.0 $\mu$m (thickness in dry state) by means of a reverse roll. The support with the coated layer was treated with an electromagnet at 3,000 gauss under wet condition to give a magnetic orientation. After the coated layer was dried, the layer was subjected to supercalendering. The resulting sheet was slitted to give video tapes (VHS type) having a width of ½ inch.

The obtained video tape was examined with respect to regeneration output, still life, and tendency to cause clogging on a magnetic head.

A signal of 4 MHz was input into the resulting video tape in a video recorder (NV-6600 type available from Matsushita Electric Industrial Co., Ltd.), and then the signal was regenerated from the video tape. It was observed that the tested video tape gave a video output of 5 dB which was a relative value with reference to a reference tape (VHS type video tape available from Fuji Photo Film Co., Ltd.) in which a video output of the reference tape recorded with a signal of the same 4 MHz was set to 0 dB.

Still life of the video tape was examined by running the tape in contact with a magnetic head in the above-mentioned video recorder under a still mode. The examination was made to determine a term (i.e., still life) at the end of which the regenerated video image under still mode turns to ⅔ of the recorded image. The tested video tape had a still life of longer than 120 min., which was satisfactory in a practical use.

Tendency of clogging on a magnetic head is examined by repeatedly running the tape in a video recorder (V-500D type available from Toshiba Co., Ltd.) equipped with a ferrite head under a half-speed mode. The examination was made to determine running times at the end of which the clogging on the head was observed. With respect to the above-mentioned video tape, it was confirmed that no clogging took place on the ferrite head even after 200 times of repeated running.

COMPARISON EXAMPLE 1

The procedure of Example 1 was repeated except that the following ferromagnetic metal alloy powder was used:
Fe-Zn-Ni alloy, Fe: 94 wt. %, Zn: 4 wt. %, Ni: 2 wt. %, S-BET: 40 m$^2$/g.

The resulting video tape was examined in the same manner as described in Example 1. The results are as follows:
Relative video output: 2 dB;
Still life: longer than 120 min.;
Tendency of clogging: no clogging was observed on the magnetic head after 200 times of repeated running.

As is evident from the results, the relative video output decreased to an extremely low level.

COMPARISON EXAMPLE 2

The procedure of Example 1 was repeated except that alumina (Al$_2$O$_3$) was replaced with the following barium sulfate:
BaSO$_4$(Mohs' scale of hardness: 3.5, particle size: 0.1-0.6 μm): 6 parts;
(particle size of less than 0.3 μm: 4 parts);
(particle size of not less than 0.3 μm: 2 parts.

The resulting video tape was examined in the same manner as described in Example 1. The results are as follows:
Relative video output: 5 dB;
Still life: 20 min.;
Tendency of clogging: clogging was noted on the magnetic head at 50 times of repeated running.

As id evident from the results, the still life was extremely short and the clogging took place at only 50 times.

COMPARISON EXAMPLE 3

The procedure of Example 1 was repeated except that the ratio between fine particles and rough particles with respect to alumina (Al$_2$O$_3$) was varied to approx. 89 : 11 (fine particles : rough particles, by weight).

The resulting video tape was examined in the same manner as described in Example 1. The results are as follows:
Relative video output: 5 dB;
Still life: 80 min.;
Tendency of clogging: clogging was noted on the magnetic head at 100 times of repeated running.

As is evident from the results, the still life shortened to 80 min. and the clogging took place at only 100 times.

COMPARISON EXAMPLE 4

The procedure of Example 1 was repeated except that the ratio between fine particles and rough particles with respect to alumina (Al$_2$O$_3$) was varied to approx. 11 : 89 (fine particles : rough particles, by weight).

The resulting video tape was examined in the same manner as described in Example 1. The results are as follows:
Relative video output: 3 dB;
Still life: 120 min.;
Tendency of clogging: clogging was noted on the magnetic head at 100 times of repeated running.

As is evident from the results, the relative video output decreased to 3 dB and the clogging took place at only 100 times.

COMPARISON EXAMPLE 5

The procedure of Example 1 was repeated except that the ratio between fine particles and rough particles with respect to alumina (Al$_2$O$_3$) was varied to approx. 33:67 (fine particles:rough particles, by weight).

The resulting video tape was examined in the same manner as described in Example 1. The results are as follows:
Relative video output: 3 dB;
Still life: 120 min.;
Tendency of clogging: clogging was noted on the magnetic head at 150 times of repeated running.

As is evident from the results, the relative video output decreased to 3 dB.

We claim:
1. A magnetic recording medium comprising a nonmagnetic support and a magnetic recording layer, said magnetic recording layer comprising a ferromagnetic metal powder having a specific surface area of not less than 42 m$^2$/g and an inorganic material powder having a Mohs' scale hardness of not less than 8, wherein at least 90 wt. % of said inorganic material powder consists of particles having a particle size of 0.1-0.6 μm, a 55-80 wt. % portion of said particles consisting of particles having a particle size of less than 0.3 μm, and the residual portion consisting of particles having a particle size of not less than 0.3 μm.

2. The magnetic recording medium as claimed in claim 1, wherein said ferromagnetic metal powder has a specific surface area of not less than 45 m$^2$/g.

3. The magnetic recording medium as claimed in claim 1, wherein a 60-75 wt. % portion of the inorganic material powder having a particle size of 0.1-0.6 μm consists of particles having a particle size of less than 0.3 μm and the residual portion consists of particles having a particle size of not less than 0.3 μm.

4. The magnetic recording medium as claimed in claim 1, wherein the total amount of said inorganic material powder contained in the magnetic recording layer is in the range of 0.1–20% by weight based on the amount of the ferromagnetic metal powder.

5. The magnetic recording medium as claimed in claim 4, wherein the total amount of said inorganic material powder contained in the magnetic recording layer is in the range of 1–10% by weight based on the amount of the ferromagnetic metal powder.

6. The magnetic recording medium as claimed in any claim of claims 1 or 2, wherein said organic material powder is a powdery compound selected from the group consisting of $Al_2O_3$ and $Cr_2O_3$.

* * * * *